United States Patent [19]
Eggers

[11] 3,768,710
[45] Oct. 30, 1973

[54] ALL PURPOSE CARRIER
[76] Inventor: William H. Eggers, 3498 Vine Maple, Eugene, Oreg. 97402
[22] Filed: June 28, 1971
[21] Appl. No.: 157,422

[52] U.S. Cl.................. 224/48 A, 211/71, 211/133
[51] Int. Cl............................................. A47g 26/06
[58] Field of Search........................ 211/13, 71, 133; 224/48; 220/23.83, 23.86; 206/DIG. 28; 229/DIG. 7

[56] References Cited
UNITED STATES PATENTS

| 2,561,022 | 7/1957 | Joxies | 220/23.6 X |
| 2,878,932 | 3/1959 | Martire | 224/48 R X |
| 1,659,344 | 2/1928 | Wissman | 224/48 C X |
| 1,305,164 | 5/1919 | Rake | 224/48 C X |
| 1,615,209 | 1/1927 | Asselin | 224/48 C X |
| 1,263,807 | 4/1918 | Saal | 211/71 |
| 2,808,191 | 10/1957 | Cramer | 224/48 R X |
| 3,142,425 | 7/1964 | Cobb | 229/DIG. 7 |

FOREIGN PATENTS OR APPLICATIONS

| 1,441,380 | 4/1966 | France | 211/133 |

Primary Examiner—Robert G. Sheridan
Attorney—Buckhorn, Blore, Klarquist & Sparkman

[57] ABSTRACT

A onepiece carrier has a disc-like tray portion having openings for receiving cups and depressions for sandwiches and the like, and a tapered handle projects downwardly from the central portion of the tray to make the tray stackable. A lower disc of the handle serves to support the cups. A loading support having upstanding legs serves to receive the tray for loading. A second tray has a tapered handle and also has posts for standing the tray.

1 Claim, 4 Drawing Figures

PATENTED OCT 30 1973  3,768,710
FIG. 1
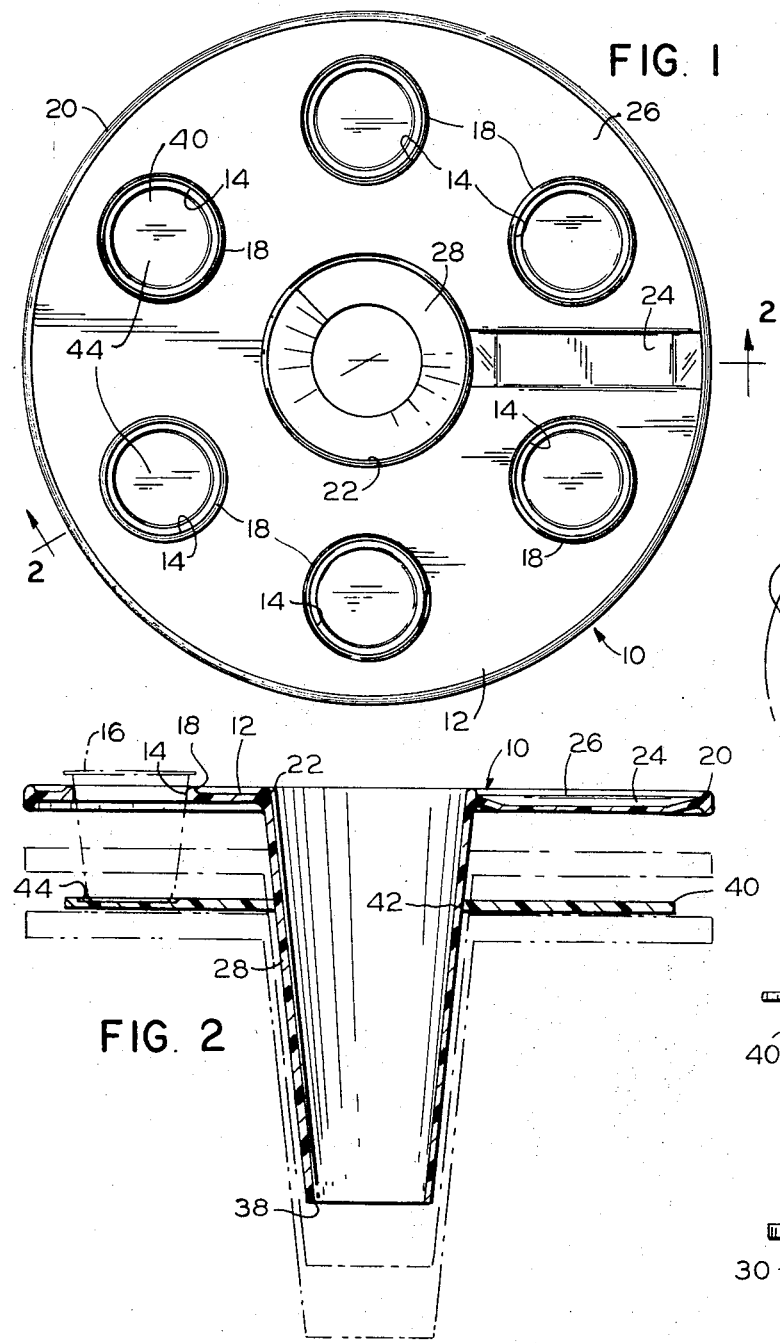
FIG. 3
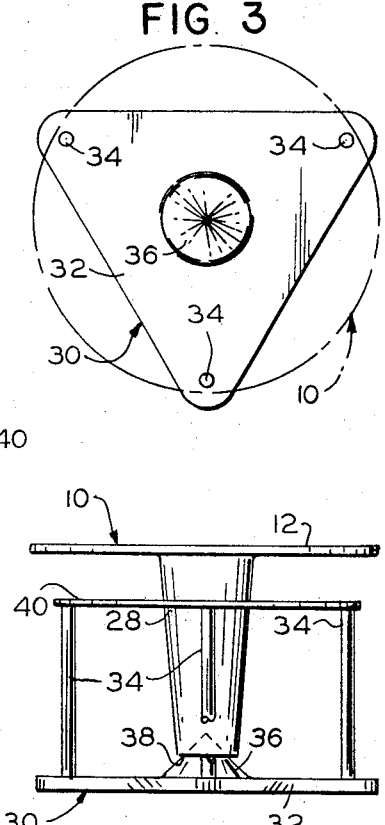
FIG. 2
FIG 4
WILLIAM H. EGGERS
INVENTOR
BY
BUCKHORN, BLORE, KLARQUIST & SPARKMAN
ATTORNEYS

ALL PURPOSE CARRIER

DESCRIPTION

This invention relates to all purpose carriers, and more particularly to carriers for carrying food and drink items.

An object of the invention is to provide all purpose carriers.

Another object of the invention is to provide carriers for carrying food and drink items.

A further object of the invention is to provide a stackable carrier having a depending tapered handle.

Another object of the invention is to provide a carrier having a tray portion with holes for cups and depressions for food items and a depending handle.

Another object of the invention is to provide a carrier having a depending handle and a support unit having upstanding posts for holding the carrier.

Another object of the invention is to provide a carrier having a handle, a top disc with holes to receive cups and a lower slip-on disc on the handle to engage the bottoms of the cups.

Another object of the invention is to provide a carrier having a tray portion from which depends a handle and a plurality of supporting legs.

In the drawings:

FIG. 1 is a plan view of an all purpose carrier forming one embodiment of the invention;

FIG. 2 is a vertical sectional view taken along line 2—2 of FIG. 1;

FIG. 3 is a plan view of a supporting stand and illustrating in broken lines the carrier of FIG. 1; and, FIG. 4 is an elevational view of the carrier of FIG. 1 placed on the supporting stand of FIG. 3.

Referring now in detail to the drawings, there is shown an all purpose carrier 10 forming one embodiment of the invention and comprising a onepiece disc or tray 12 having holes 14 through it spaced sufficiently to accommodate a beverage cup 16. The holes 14 have raised lips or rims 18 and outer periphery 20 of the disc 12 is also formed with a raised rim, as is center opening 22. These rims, as well as providing strength, have a second function of that of a dam. If one of the cups 16 should be spilled somewhat, the rims prevent the liguid from getting on the person. One or more depressions 24 are provided in the top surface 26 of the disc 12 positioned between the holes 14 and intended to be used for receiving a hot dog, candy bar, or other food to prevent it from shifting. A tapered tubular carrying handle 28 extends downward from the center of the disc 12. The holes 22 in the handle 28 provides for easy cleaning as well as enabling a large number of the carriers to be compactly stacked as illustrated in FIG. 2 for collection and/or storage.

While storing or loading the carrier with food and drink, it is placed on a supporting stand 30 which includes a base 32 with three or more upwardly extending posts 34 which support the tray 10 from the underside of the disc 12. The tray 10 is positioned and centered by a cone-shaped locator 36 forming part of the base 32. The locator fits loosely into the bottom 38 of the tray handle 28. As can be seen in FIG. 4, the tray 10 is quite stable for loading while on the stand 30. If desired, the carrier could be provided with three integral, outwardly and downwardly tapered, nestable legs (not shown) for support independently of the stand.

A lower disc 40 (FIG. 2) may be placed on the handle 28 and slid up to wedge itself on the handle in a position adapted to receive the bottoms of the cups in circular depressions 44 to support the cups, the depressions 44, of course, being aligned with the holes 14. The disc 40, although disclosed herein as separable from the handle, may, of course, be integral with the handle either by initially molding it or by adhering the disc to the handle. The disc imparts strength and balance to the cups or other containers. And the recesses 44 could be holes. If desired, the disc could have supporting legs.

I claim:

1. In an all-purpose carrier,
   a disc-like tray having a central opening therethrough,
   a handle of a length sufficient to be grasped by the thumb and fingers of a user and centered on the opening and fixed to the tray,
   the tray having cup openings therein spaced radially outwardly from the handle,
   a lower supporting disc on the outside of the handle and spaced below the tray for supporting a cup in the cup opening,
   the handle extending sufficiently below the disc for the portion thereof below the disc to serve as a handle, the disc being a slip-on disk and being removable from the handle to permit the tray to be stacked with another identical tray, the handle being tapered so as to nest in an identical handle.

* * * * *